United States Patent [19]

Yoshifusa et al.

[11] Patent Number: 5,007,713
[45] Date of Patent: Apr. 16, 1991

[54] BEAM CONVERTING APPARATUS WITH A PARALLEL LIGHT BEAM INPUT AND OUTPUT FROM ONE PRISM PLANE

[75] Inventors: Koji Yoshifusa; Taizo Yokota, both of Higashihiroshima, Japan

[73] Assignee: Sharp Kabushiki Kaisha, Osaka, Japan

[21] Appl. No.: 527,779

[22] Filed: May 24, 1990

[30] Foreign Application Priority Data

May 27, 1989 [JP] Japan .................................. 1-133488

[51] Int. Cl.⁵ ........................ G02B 5/04; G02B 13/10; G11B 7/135
[52] U.S. Cl. ................................... 350/286; 350/421; 350/445; 350/447; 250/201.5; 369/44.23
[58] Field of Search ............... 350/286, 421, 445, 447, 350/173, 171; 369/44.23, 112; 250/201.5

[56] References Cited

U.S. PATENT DOCUMENTS 4,358,200 11/1982 Heemskerk et al. ............ 369/44.23
4,759,616 7/1988 Marchant ............................ 350/286
4,929,067 5/1990 Sander ................................. 350/286

Primary Examiner—Jon W. Henry

[57] ABSTRACT OF THE DISCLOSURE

A beam converting apparatus utilizes a semiconductor laser element, a device which converts the laser beam from the semiconductor laser element into a parallel beam, and a prism possessing a first plane for receiving the parallel beam and a second plane for fully reflecting so that the beam entering from the first plane may be emitted from the first plane. An apex angle of the first plane and second plane is defined so that the sum of the incidence angle ($\theta 1$) to the normal of the first plane and the exit angle ($\theta 2$) to the normal of the first plane of the beam fully reflected from the second plane emitted from the first plane, ($\theta 1$)+($\theta 2$) is about 90 degrees. This prism allows a reduction in the size of the semiconductor laser element.

4 Claims, 4 Drawing Sheets

BEAM CONVERTING APPARATUS WITH A PARALLEL LIGHT BEAM INPUT AND OUTPUT FROM ONE PRISM PLANE

BACKGROUND OF THE PRESENT INVENTION

1. Field of the Invention

The present invention relates to a beam converting apparatus suitable for the shaping of beams in optical disk and other optical pickups.

2. Description of the Prior Art

A fundamental construction of a beam shaping optical system in an optical pickup is shown in FIG. 1. The light source for optical pickup, generally, is a semiconductor laser element 11. Its far-field pattern, or the light intensity distribution of the beam section is approximately elliptical. The luminous flux emitted from the semiconductor laser element 11 is converted into a parallel luminous flux by a collimator lens 12, and is applied to a beam shaping optical system 15 in which the light intensity distribution of the beam section is shaped into a circular form. The luminous flux is focused on the signal plane of an optical disk 14 by an objective lens 13 to record or reproduce the signal. In the semiconductor laser element 11, structurally, the emission angle is wide in the vertical direction, and narrow in the direction parallel to the junction plane of the semiconductor laser chip. Expressing each emission angle as $\theta 10$ and $\theta 11$, the relation is generally $\theta 10:\theta 11 =$ approx. 3:1. In FIG. 1, 11 is the luminous flux in the $\theta 10$ direction, and 12 is the luminous flux in the $\theta 11$ direction. By expanding the luminous flux 12 by the beam shaping optical system 15, the light intensity distribution of the beam section is shaped into a circular form.

In the prior art the structure as shown in FIG. 2 (e.g. The Japanese Patent Publication Sho. No. 61-53775), the optical system 15 is bent at an acute angle by the shaping prism 16, and the optical pickup is increased in size, while the shape of the optical block, the housing, is complicated and costly. Furthermore, when attempting to shrink the optical pickup, a triangular mirror or a plate mirror known as a riser mirror is placed behind the shaping prism 16 so as to deflect the light by 90 degrees. This riser mirror also increases the cost of the optical pickup device.

SUMMARY OF THE PRESENT INVENTION

It is a primary object of the present invention to present a beam converting apparatus reduced in structural size, by shaping the laser beam from the semiconductor laser element into a circular form and deflecting the laser beam by about 90 degrees.

To achieve the above object, the present invention contemplates a beam converting apparatus which comprises a semiconductor laser element, a device for converting the laser beam from the semiconductor laser element into a parallel beam, and a prism possessing a first plane for receiving the parallel beam and a second plane for fully reflecting so that the beam entering from the first plane may be emitted from the first plane, wherein the apex angle of the first plane and second plane is defined so that the sum of the incidence angle $\theta 1$ to the normal of the first plane and the exit angle $\theta 2$ to the normal of the first plane of the beam fully reflected from the second plane emitted from the first plane, $(\theta 1+\theta 2)$, may be about 90 degrees.

According to the present invention, to set the rise angle of the luminous flux which is a laser beam, the deflecting angle, to about 90 degrees, the apex angle $\theta 3$ of the first plane and second plane is determined so that the sum of the incidence angle $\theta 1$ to the normal of the first plane of the prism and the exit angle $\theta 2$ to the normal of the first plane, $(\theta 1+\theta 2)$, may be about 90 degrees. As a result, the rise angle of the laser beam may be set at about 90 degrees. Also, by determining the shaping ratio W1/W2 (see FIG. 5) of the luminous flux width of the laser beam emitted from the semiconductor laser element at about 1:3, the luminous flux in the direction $\theta 11$ parallel to the junction plane in the semiconductor laser chip of the semiconductor laser element is expanded about three times so that the intensity distribution of the laser beam section may be shaped in a circular form. Thus is realized by a prism simultaneously possessing both the function of the shaping prism mentioned in the prior art and the function of the riser mirror.

In the present invention, therefore, by setting the sum of the incidence angle $\theta 1$ to the normal of the first plane of the prism and the exit angle $\theta 2$ to the normal of the first plane of the light fully reflected by the second plane and emitted from the first plane at about 90 degrees, the parallel beam obtained by setting the semiconductor laser element parallel is raised and deflected to about 90 degrees. The intensity distribution of the laser beam section may be transformed from a flat profile to a circular form, and the structure of the laser may be reduced in size.

In the prism of the present invention, meanwhile, the apex angle $\theta 3$ of the first plane and second plane is selected at about 15 degrees when the incidence angle $\theta 1$ to the normal of the first plane is about 75 degrees, and the exit angle $\theta 2$ to the normal of the first plane of the light fully reflected by the second plane is about 15 degrees.

Furthermore, a reflection preventive film is formed on the first plane of the prism.

The prism of the present invention comprises glass having a refractive index of about 1.765, and the wavelength of the laser beam emitted from the semiconductor laser element is selected at 780 nm.

BRIEF DESCRIPTION OF THE DRAWINGS

Other and further objects, features and advantages of the present invention will be more explicit from the following detailed description taken with reference to the drawings wherein.

DETAILED DESCRIPTION OF THE PREFERRED EMBODIMENTS

Figure 1:
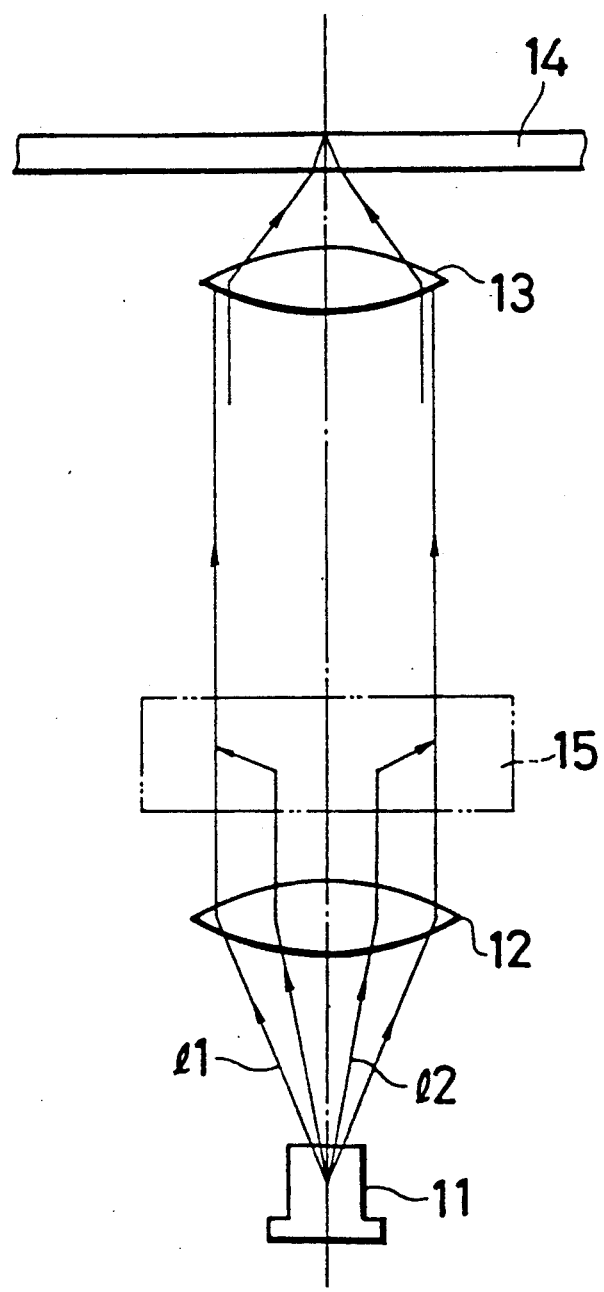
FIG. 1 is a view showing a fundamental structure of an optical pickup.
Figure 2:
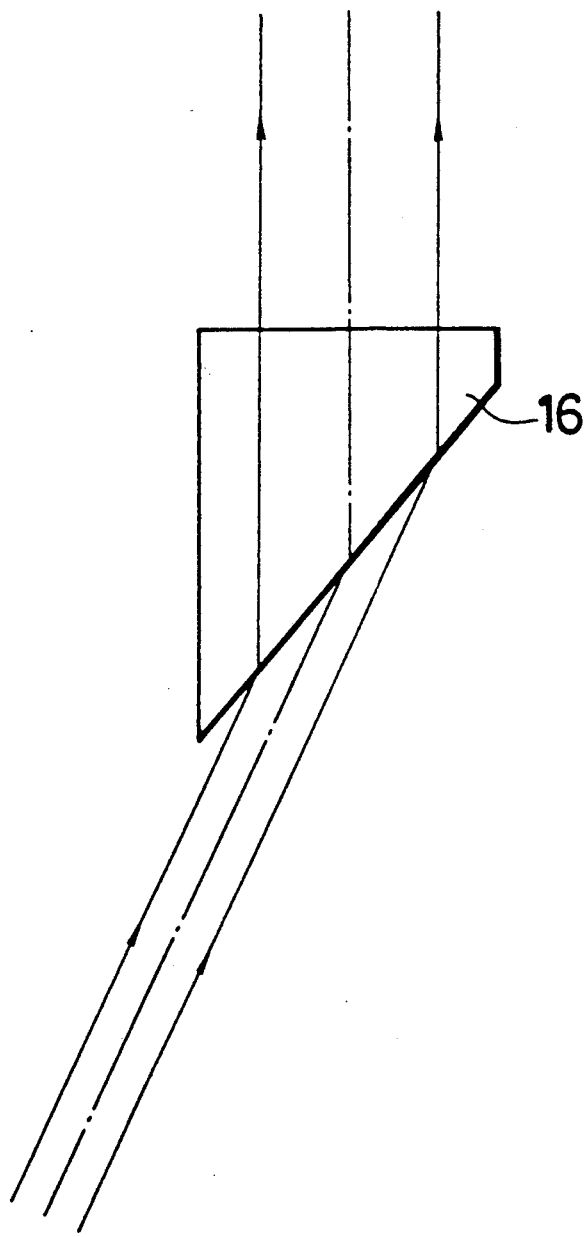
FIG. 2 is a view showing a prism 16 in the prior art.

Referring now to the drawings, preferred embodiments of the present invention are described below.

Figure 3:
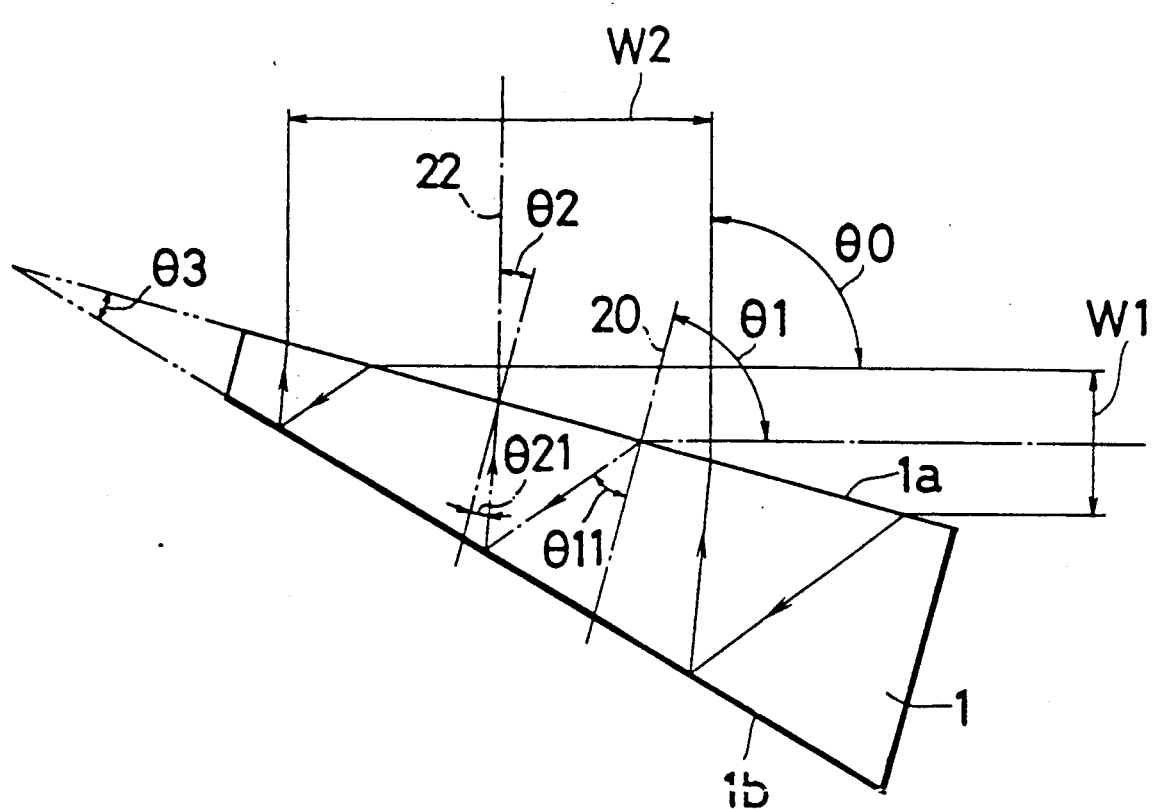
FIG. 3 is a view of a prism 1 used in a beam converting apparatus in one of the present embodiments of the invention.
Figure 4:
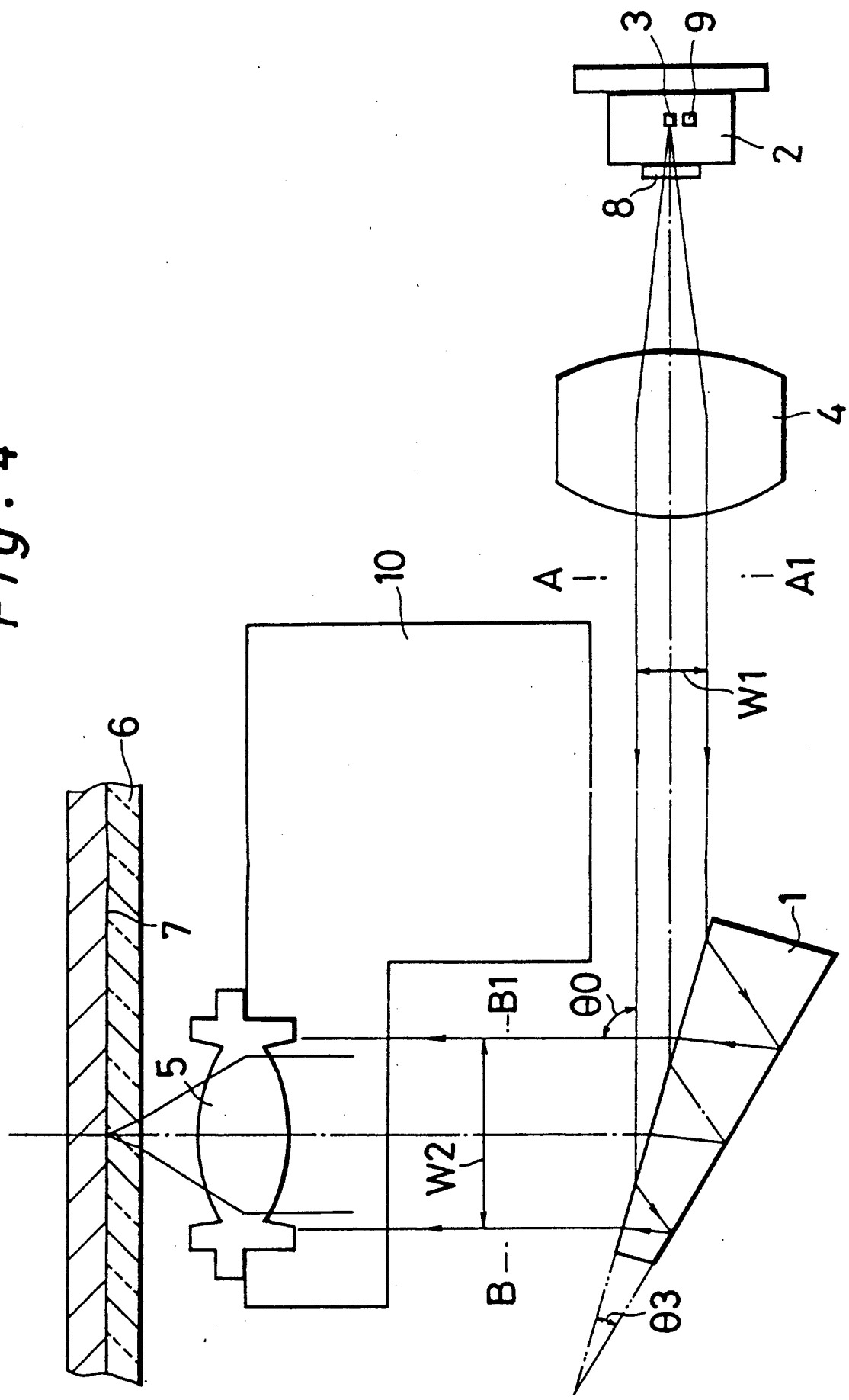
FIG. 4 is a view showing the entire structure of an embodiment of the present invention.

FIG. 3 is a view of a prism 1 used in a beam converting apparatus of one of the present embodiments of the invention. The prism 1 is used in the beam converting apparatus of an optical pickup of which the entire structure is shown in FIG. 4. A semiconductor laser element 3 is disposed in laser beam emitting and receiving device 2. The laser beam from the semiconductor laser chip of the semiconductor laser element 3 is transformed into a parallel beam by a collimator lens 4, and is raised to about 90 degrees by the prism 1, before being received by an objective lens 5. The laser beam from this objective lens 5 is focused onto a reading plane 7 of an optical disk 6 and is modulated by the pits in the optical disk 6. The luminous flux reflected by the reading plane 7 runs through the objective lens 5, prism 1 and collimator lens 4 and is diffracted by a hologram diffraction element 8 disposed on the front plane of the emitting and receiving device 2. The luminous flux is photoelectrically converted by a detector element 9, thereby enabling the reading of the information recorded in the recording plane 7 of the optical disk 6. By using this prism 1, the parallel beam from the collimator lens 4 is raised by the rise angle of $\theta 0$, and the angle $\theta 0$ received by the objective lens 5 is about 90 degrees. The objective lens 5 is controlled in focus and tracking by a driving source 10.

The prism 1 possesses a first plane $1a$ and a second plane $1b$. The light entering from the first plane $1a$ is fully reflected by the second plane $1b$ so as to be emitted from the first plane $1a$. The apex angle $\theta 3$ between the first plane $1a$ and the second plane $1b$ is determined so that the incidence angle $\theta 1$ to the normal 20 of the first plane $1a$ may be about 75 degrees, and that the exit angle $\theta 2$ to the normal 22 of the first plane $1a$ of the light 21 fully reflected from the second plane $1b$ emitted from the first plane $1a$ may be about 15 degrees. This apex angle $\theta 3$ is about 15 degrees.

The light entering the first plane $1a$ of the prism 1 is refracted according to Snell's law, and enters the prism 1.

$$\frac{\sin \theta 1}{\sin \theta 11} = \frac{n1}{n11} \quad (1)$$

$$\frac{\sin \theta 2}{\sin \theta 21} = \frac{n1}{n11}$$

Figure 5:
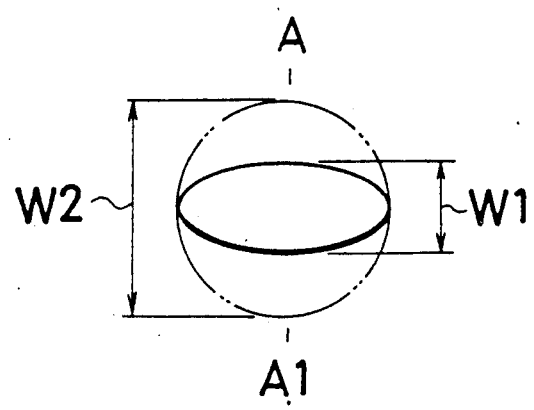
FIG. 5 is a view for explaining the operation of shaping a flat laser parallel beam by the prism 1.

$\theta 21$ is the exit angle of the light leaving the prism 1 to the normal of the first plane $1a$, $n1$ is the refractive index of air, and $n11$ is the refractive index of the prism 1. On the second plane $1b$, according to the rule of reflection, the light is reflected so that the incidence angle and reflection angle may be equal, and returns to the first plane $1a$, and is refracted according to Snell's law and is emitted outside the prism 1. In order to set the shaping ratio W1/W2 at about 1:3 while keeping the rise angle $\theta 0$ of the luminous flux at about 90 degrees, the apex angle $\theta 3$ of the prism 1 is about 12.4 degrees when the material of the prism 1 is a glass having a refractive index $n11$ of about 1.765 and is about 14.9 degrees when the material is a glass having a reflective index $n11$ of about 1.511. The wavelength of the semiconductor laser element 3 is 780 nm. FIG. 5 is a view of the parallel beam as seen from section line A-A1 in FIG. 4, and the double dot chain line in FIG. 5 denotes the section of the luminous flux as seen from the section line B-B1. The width W1 of the luminous flux initially entering the prism 1 is expanded to W2, $$W2 \approx 3 \cdot W1 \quad (2)$$

and thus the luminous flux width is expanded about three times by the refraction and reflection of the prism, and the luminous flux having a nearly elliptical section of the incident parallel beam is shaped into a luminous flux of a nearly circular section. The incidence angle $\theta 1$ to the normal of the first plane $1a$ is selected at around 75 degrees because, by setting the exit angle $\theta 2$ to the normal at around 15 degrees, the luminous flux may be deflected by about 90 degrees and the shaping ratio W1/W2 may be set to about 1:3. In other words, if the incidence angle $\theta 1$ to the normal is set larger, the returning luminous flux from the disk 6 by full reflection is entrapped within the prism 1, and when the incidence angle $\theta 1$ to the normal line is set smaller, the shaping ratio W1/W2 becomes smaller, and the intended object is not realized.

Or else, by forming a reflection preventive film on the first plane $1a$ of the prism, the reflection of the incident luminous flux may be prevented. The effect of prevention of reflection by the reflection preventive film is expected in a material having a large refractive index $n11$ for the medium of the prism 1.

In such beam converting apparatus, the collimated luminous flux before shaping which enters the prism 1 is flat, as shown in FIG. 5, with respect to the heightwise direction of the optical pickup (the vertical direction in FIG. 4), and the space produced by this flatness may be packed with magnetic circuit of the driving source 10, base member and others. As a result, an optical pickup thin in the vertical direction may be realized.

Incidentally, it was conventionally attempted to obtain the same effect as in the present invention by a half mirror of flat plate as disclosed in the Japanese Laid-open Patent Sho. No. 63-247716, but by shaping of the collimated beam by multiple reflection in this flat plate mirror, the wave front of the luminous flux that must be controlled in the order of wavelength is largely deviated, and a spot cannot be focused within the diffraction limit by the objective lens. By contrast, with the prism 1 of the invention, the wave front is not changed at all, and the luminous flux after shaping may be received by the objective lens 5 without generating any wave front aberration, so that a spot of favorable diffraction limit may be obtained by the objective lens 5.

In this embodiment, therefore, only by incorporating the prism 1 to a simple structure into the optical housing at the same precision as in the riser mirror, the functions of both shaping prism and riser mirror may be obtained at the same time, and further by effectively utilizing the space produced by the flat luminous flux before shaping, an ultrathin optical pickup of low cost can be achieved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A beam converting apparatus comprising:
   a semiconductor laser element;
   means for converting a laser beam from said semiconductor laser element into a parallel beam; and
   a prism possessing a first plane for receiving and transmitting said parallel beam and a second plane for fully reflecting so that said parallel beam entering from said first plane may be emitted from said first plane, wherein an apex angle of said first plane and second plane is defined so that a sum of an incidence angle ($\theta1$) to a normal of said first plane and an exit angle ($\theta2$) to a normal of said first plane of said parallel beam fully reflected from said second plane emitted from said first plane, ($\theta1 + \theta2$), is about 90 degrees.

2. The beam converting apparatus as claimed in claim 1, wherein said prism is designed so that said apex angle formed by said first plane and said second plane is about 15 degrees, and when said incidence angle $\theta1$ to said normal of said first plane is about 75 degrees, said exit angle $\theta2$ to said normal of said first plane of said parallel beam fully reflected by said second plane is about 15 degrees.

3. The beam converting apparatus as claimed in claim 1 or 2, wherein a reflection preventive film is formed on said first plane of said prism.

4. The beam converting apparatus as claimed in claim 2, wherein said prism is made of a glass having a refractive index of about 1.765, and wherein a wavelength of said laser beam emitted from said semiconductor laser element is 780nm.

* * * * *